J. GELL.
VARIABLE SPEED MECHANISM.
APPLICATION FILED FEB. 26, 1913.

1,108,741.

Patented Aug. 25, 1914.

2 SHEETS—SHEET 1.

Attest:
Ewd L. Tolson
Chas. F. Calhoun Jr.

Inventor:
John Gell,
by Spear, Middleton, Donaldson & Spear
Attys.

J. GELL.
VARIABLE SPEED MECHANISM.
APPLICATION FILED FEB. 26, 1913.

1,108,741.

Patented Aug. 25, 1914.
2 SHEETS—SHEET 2.

Attest:
Fred R. Tolson
Chas. F. Calhoun, Jr.

Inventor: John Gell,
by Spear, Middleton, Donaldson & Spear
Attys.

UNITED STATES PATENT OFFICE.

JOHN GELL, OF LONDON, ENGLAND.

VARIABLE-SPEED MECHANISM.

1,108,741. Specification of Letters Patent. Patented Aug. 25, 1914.

Original application filed January 24, 1911. Serial No. 604,487. Divided and this application filed February 26, 1913. Serial No. 750,898.

*To all whom it may concern:*

Be it known that I, JOHN GELL, a subject of the King of Great Britain, residing at Pine Grove, Tollington Park, London, England, have invented certain new and useful Improvements in Variable-Speed Mechanism, of which the following is a specification.

My invention relates to a variable speed mechanism which is particularly adapted for automatic transmitters as disclosed by me in Letters Patent of the United States #835,750, November 13, 1906, and #890,042, June 9, 1908, my present invention being a division of that disclosed in application for Letters Patent of the United States filed January 24, 1911, #604,487.

Figure 1:
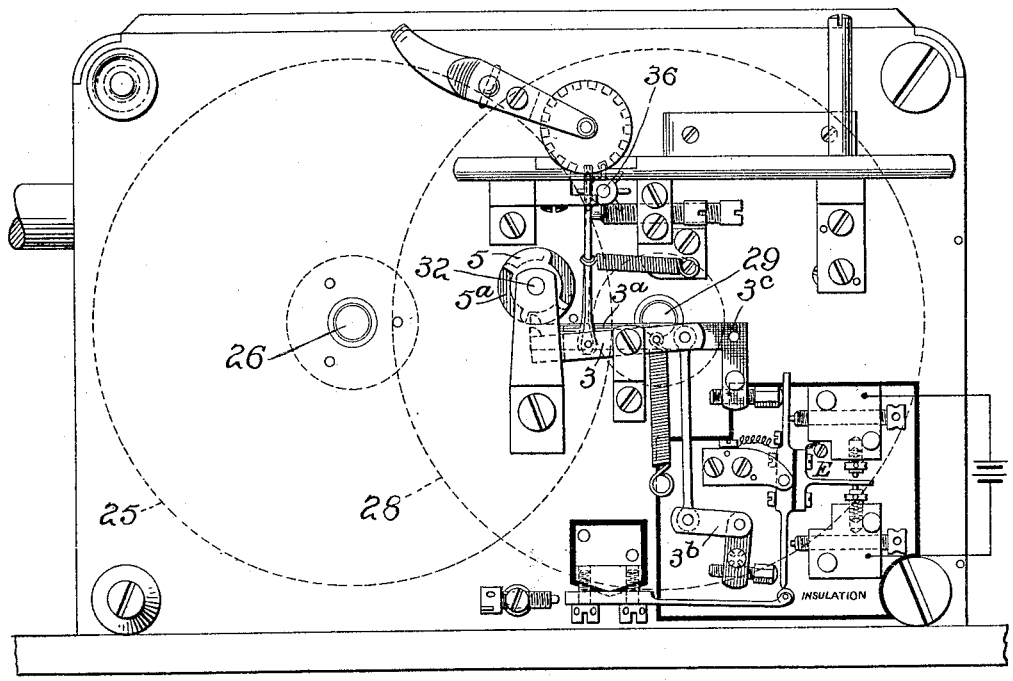
Figure 2:
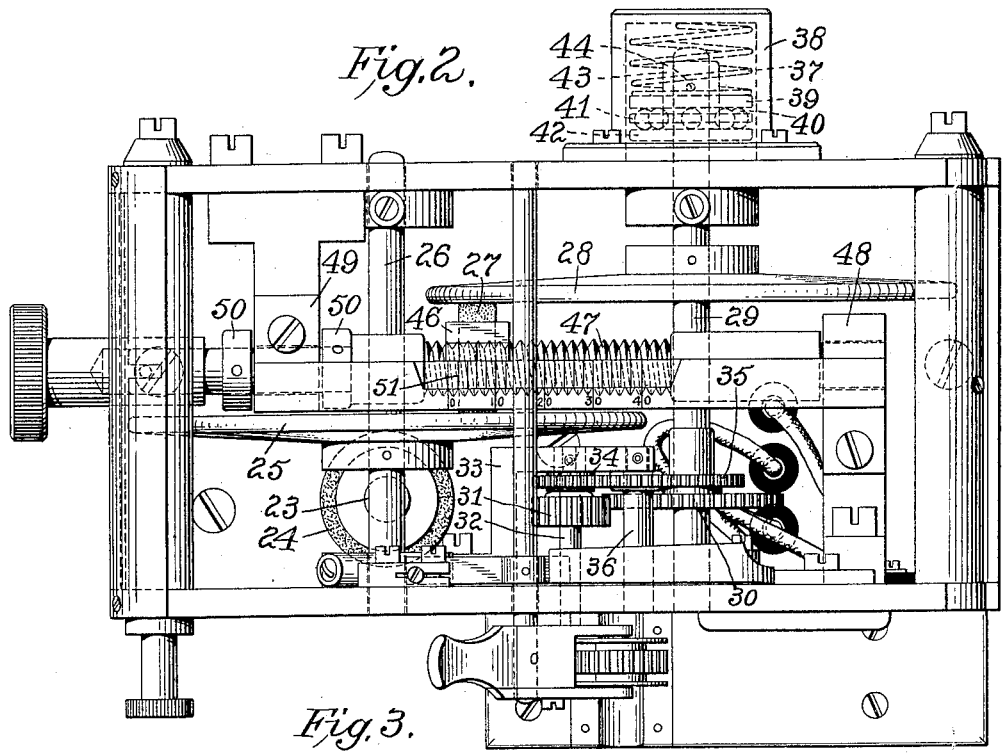
Figure 3:
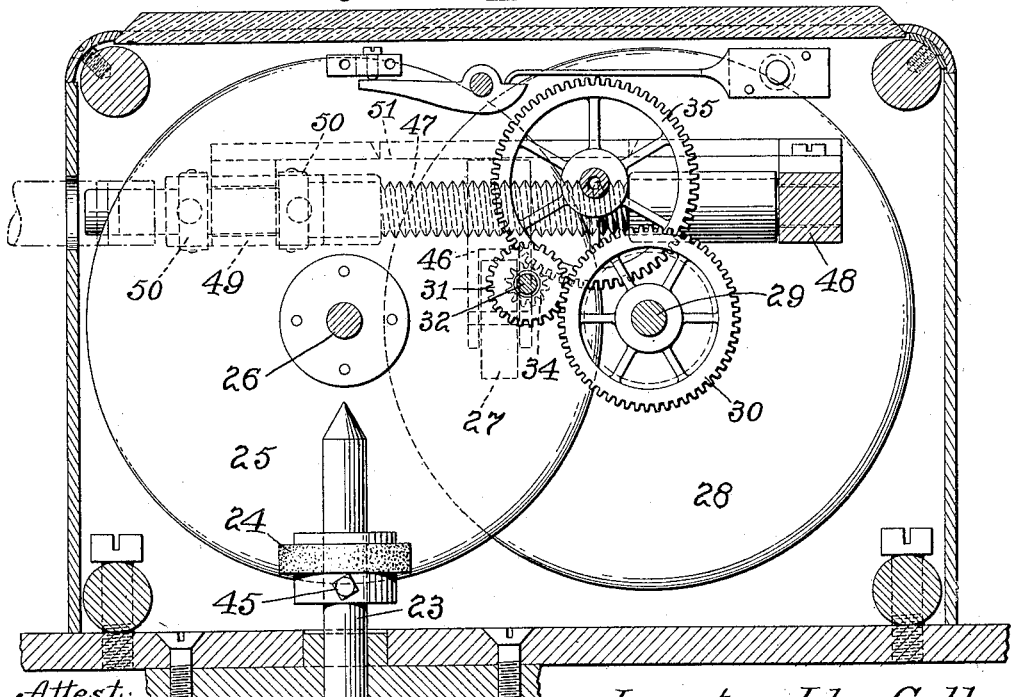

In the accompanying drawings, Figure 1 is a side elevation of my invention as applied to a telegraphic transmitter. Fig. 2 is a plan view of a transmitter embodying my invention. Fig. 3 is a vertical sectional view showing driving mechanism in elevation.

Referring to Fig. 1, I here illustrate, as an example, a main and secondary key action to which my motor mechanism may be connected, and it is thought unnecessary to describe this transmitter mechanism in detail further than to point out that the members 3, 3ᵃ, which carry the transmitting pins of the main key action are operated from cams 5, 5ᵃ on a shaft 32, and these levers 3, 3ᵃ, operate the hammer carrying the portions 3ᵇ, 3ᶜ, of the main key action, which in turn operate the secondary key action shown generally at E.

The apparatus is driven from any suitable motor through a shaft 23, Figs. 2 and 3, carrying a friction drive disk 24 bearing upon a disk 25 on a shaft 26. This disk 25, through a friction wheel 27, drives another friction disk 28 on the shaft 29, and on this is a gear wheel 30 meshing with a gear 31 mounted on the shaft 32 journaled in the casing, and in a bracket 33, Fig. 2, and upon this shaft the double cam 5, 5ᵃ is mounted. The shaft 32 has fixed thereto a pinion 34 meshing with a gear 35 on the shaft 36 of the star-feed wheel. By this train of gearing the star-feed wheel and the cam 5, 5ᵃ are driven in proper time with each other.

The friction disks and wheels are kept in proper driving contact by a spring 37 in a casing 38 fixed to the frame, said spring surrounding the end of the shaft 29 and pressing in a ring or disk 39 loose on said shaft, and bearing upon anti-friction balls 40 carried by a ring 41, said balls, in turn, bearing upon a ring or flange 42, the sleeve 43 of which is pinned at 44 to the shaft 29.

For varying the speed of the drive, the driving friction wheel 24 is mounted adjustably on the motor shaft 23, so that by loosening the screw 45 the wheel may be set in different positions toward or from the center of rotation of the disk 25.

The transmission friction wheel 27 is mounted in a hanger 46 through which a screw threaded rod 47 passes. This rod or shaft turns in bearings in brackets 48, 49, being held against longitudinal movement by collars 50 pinned on the shaft. By turning the screw shaft the wheel bracket 46 may be adjusted in respect to the centers of rotation of the friction disks 25 and 26 to vary the speed of transmission. A scale 51 is supported on the brackets 48 and 49, and a mark on the hanger 46 will register with the scale marks to secure fineness of adjustment.

It will be understood that the hanger 46 of the intermediate friction wheel 27 permits the proper pressure to be secured between the friction surfaces, this hanger being free to turn about the screw shaft, though no appreciable turning movement takes place in securing adequate pressure for transmission.

I claim:—

1. In combination in a variable speed mechanism, a rotary member to be driven, a drive shaft, and transmission means comprising a pair of parallel friction disks, arranged on parallel shafts, a friction wheel bearing on the opposing faces of the disks, a screw shaft, extending transversely to the shafts of the disks, and a hanger depending from said screw shaft and free to turn about the same carrying the friction wheel, substantially as described.

2. In combination in a variable speed mechanism, a rotary member to be driven, a power shaft, a friction wheel thereon, a pair of friction disks mounted on parallel shafts, a friction wheel between them, a connection from the driven friction disk to the rotary member, and a spring for pressing one friction disk, which pressure is transmitted through the intermediate friction wheel to the other friction disk and to the friction wheel on the motor shaft, said intermediate friction wheel being mounted in a bearing adjustable radially and movable transversely in respect to the friction disks, substantially as described.

3. In combination in a variable speed mechanism, a member to be rotated, a motor shaft, a friction drive wheel thereon, adjustable longitudinally of the said shaft, a friction disk mounted on a shaft at right angles to the motor shaft and upon which disk the driving friction wheel bears, a second friction disk, rotating in a plane parallel with the first, a shaft therefor arranged parallel with that of the first disk, a friction wheel journaled in a movable hanger between the two disks adjustably mounted, and when adjusted moving toward the periphery of one and toward the axis of the other disk, and a connection between the second disk and the rotary member to be driven, substantially as described.

In testimony whereof I affix my signature in presence of two witnesses.

JOHN GELL.

Witnesses:
O. J. WORTH,
C. P. LIDDON.

---

Copies of this patent may be obtained for five cents each, by addressing the "Commissioner of Patents, Washington, D. C."